Patented Jan. 29, 1946

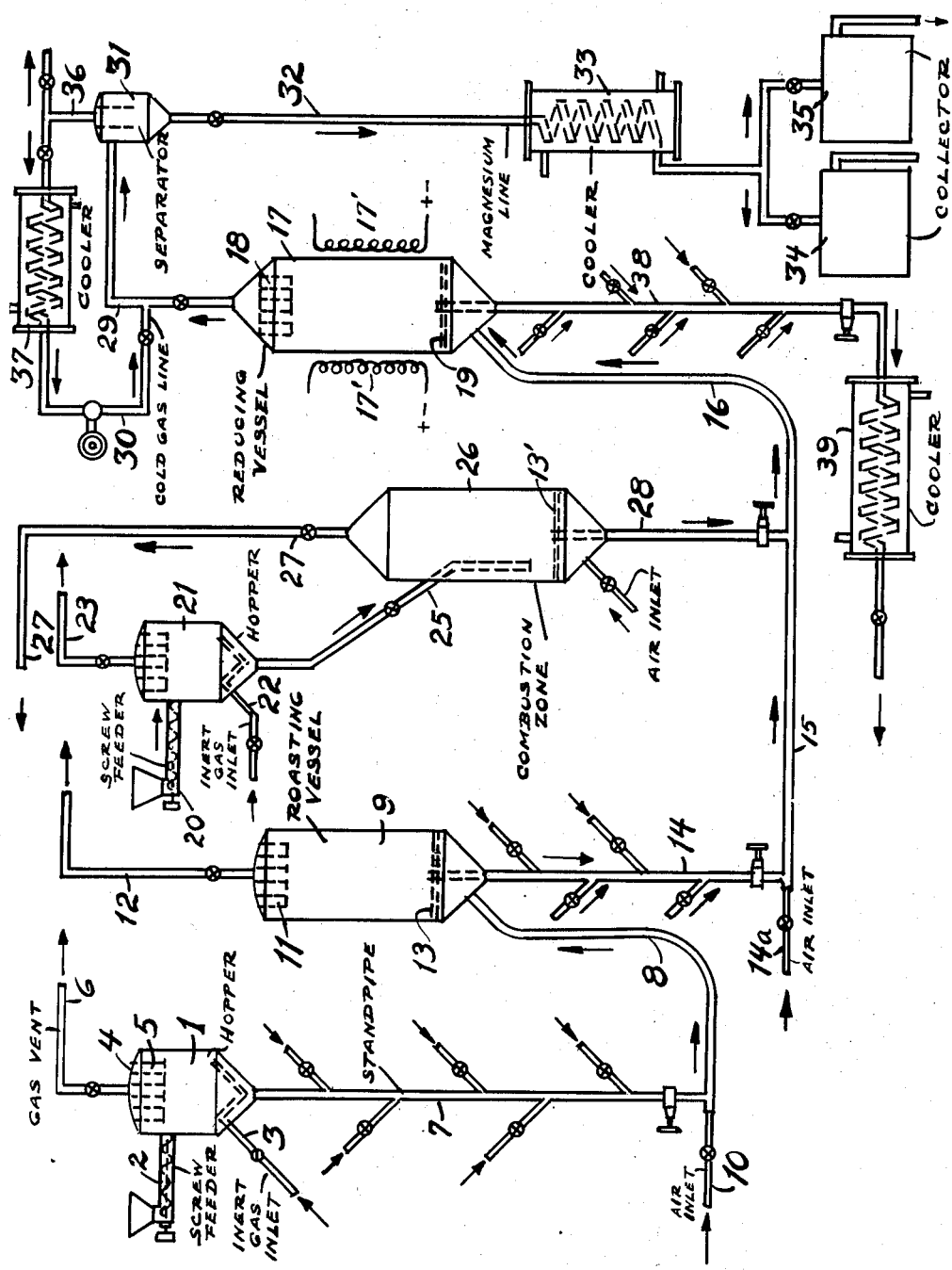

2,393,704

UNITED STATES PATENT OFFICE 2,393,704

PROCESS OF PRODUCING MAGNESIUM

Henry J. Ogorzaly, Baton Rouge, La., assignor to Standard Oil Development Company, a corporation of Delaware Application June 26, 1943, Serial No. 492,356

4 Claims. (Cl. 75—26)

The present invention relates to the art of producing valuable metals by reduction of their oxide ores and more specifically to the production of metals such as magnesium by the reduction of oxides such as magnesia, by the action of carbon upon the ore at high temperatures.

The drawing is a diagrammatic view in sectional elevation of an apparatus for producing metal such as magnesium by the reduction of its oxide by means of carbon and the drawing shows the flow of the various materials.

Certain metals, such as magnesium, zinc and cadmium, can be produced by the reduction of their oxide ores and other ores such as hydroxides, carbonates and others, which on heating yield the oxide, by the action of carbon at elevated temperatures whereby carbon monoxide is largely produced. These chemical reactions are themselves well known but the processes by which they are carried out have not been entirely satisfactory and are inefficient. In the present invention, one object is to devise a continuous method for carrying out the process adaptable to large as well as small scale operations, by which various metals of the particular class referred to above can be efficiently produced. Other objects will be apparent to those skilled in the art.

Referring to the drawing, a magnesia ore, such as brucite or magnesite or even mixed metal ores such as dolomite, is fed to a hopper 1 by means of a screw feeder 2. The ore is in a finely divided condition preferably 50 mesh or smaller, say 100 or 200 mesh, and in the hopper it is "fluidized" by a stream of air or inert gas, such as flue gas, which is admitted by the pipe 3. "Fluidizing" consists in suspending the material in the gas so as to form a dense suspension in which form it is said to be in a fluidized condition. It is then capable of flow through pipes, ducts, valves and other fittings much like a liquid and exhibits both static and dynamic head.

The hopper 1 preferably is fitted with a closed top 4 and is also supplied with a dust separator 5 so that the gas vented at 6 is substantially dust free. The fluidized magnesia passes down the standpipe 7 from the bottom of the hopper and thence by a pipe 8 into the lower portion of a roasting vessel 9. Air is added to the fluidizing stream by pipe 10 and fuel gas may be charged to the vessel to provide the necessary heat. The roasting vessel is tall and cylindrical in form and is supplied with a dust separator 11 in its upper end and a gas vent 12. Near the lower end a screen or plate 13, fitted with holes, acts as a distributor. The suspension is thus heated and thoroughly roasted while in the fluidized state within this reaction vessel. A pipe 14 is provided to draw a stream of the roasted material from the bottom of the vessel 9 and additional air or inert fluidizing gas is added at 14a. It will be understood that the material in this stream is still maintained in a fluidized condition and passes through ppes 15 and 16 and so to the reducing vessel 17, which is similar to the roaster, with a dust separator 18 and the distributor plate 19. This vessel must be heated strongly and electric resistance heating coils 17' are shown for this purpose, although it will be understood that other means for obtaining extremely high temperatures of the order of 2200 to 2300° C. may be used.

Finely divided coke is fed by the screw feeder 20 into a hopper 21, which is in all ways similar to hopper 1 described above, and the coke is likewise fluidized but in this case by a stream of inert gas introduced at 22. As before, gas is vented at 23 through the dust separator 24. The fluidized coke is now fed by the pipe 25 into a combustion zone 26 which is similar to the roaster 9 and a portion of the coke is burned therein to produce a high temperature. Gas is drawn off by the pipe 27 and may be employed to supply the pipes 3, 14a and 22 described above, if desired. A large amount of heat is contained in this gas and it should, of course, be recovered for some useful purpose. A stream of fluidized coke is drawn off from the combustion vessel 26 by a pipe 28 which discharges it into the reducing vessel 17, referred to above, preferably by way of the pipe 16. In any case, the streams of roasted magnesia and carbon are thoroughly admixed in vessel 17 and in condition for rapid reaction which gives rise to formation of vaporized magnesium and carbon monoxide. Vapors are removed by the pipe 29 and the stream is quickly chilled by an added stream of cold gas which is introduced by the pipe 30. The temperature should, of course, be reduced as rapidly as possible so as to prevent reversal of the reaction by which magnesium was formed and at the same time to condense or solidify the vaporized magnesium. Solids are then separated from the gas in the separator 31 which is shown in the form of a cyclone separator, but bag filters or other types of similar equipment may, of course, be used. The magnesium is thus drawn off by the pipe 32 to cooler 33 and the collectors 34 and 35. Gas is taken from the separator 36, cooled at 37 and may be recirculated to the pipe 30 for reuse.

If high grade magnesia and ash free carbon are used, there will of course be no ash in the process, but such materials are difficult to obtain and the ash, which may consist of unreduced magnesia and other materials, such as lime, which are not reduced by the process, may be conveniently drawn off from the reduction zone by means of the pipe 38. This stream is cooled at 39 and disposed of as most convenient.

In the above description it will be readily understood that the roasting and reduction processes are carried out continuously while the solids are in a fluidized condition. By maintaining them in this fluidized state, it is possible to make the process continuous. As indicated before, the materials are preferably in a finely divided condition for good fluidizing, preferably from 100 to 200 mesh, but even relatively large lumps of ¼ to ½" may be fluidized under appropriate gas velocities. In order to fluidize fine powders, velocities of say ½" to 6 feet per second may be used, depending on the particular gas employed and the particle size and density, but with larger particles, say ¼ to ½" lumps, much higher gas velocities are required, say from 10 to 20 feet per second. Only a small amount of gas is required to keep a finely-divided solid material in the fluidized condition, say of the order of 0.02 to 0.07 cubic feet per pound of material, but this also varies somewhat with the nature of the solid and the gas. Small amounts of gas are added to the various standpipes through short pipes, shown on the drawing, in order to maintain the material in a fluidized condition. It is particularly desirable to add small amounts of the gas to downwardly flowing streams of the solid as indicated on the drawing. With the small amounts of gas required, the suspensions are very dense and it has been found that the only effect of adding more gas is to decrease the density of the suspension. This fact is taken advantage of as a means for effecting the flow of the fluidized streams through the apparatus and no pumps, fans or blowers are required to operate directly on a stream of high dust content. In further explanation, it should be noted that the density in the pipe 7, for example, is greater than in the pipe 8 due to the large addition of gas at 10 and this difference of density brings about a pressure differential which is used to overcome the frictional resistance of flow through the pipes. The entire apparatus must thus be designed with these pressure differentials in view and flow can thus be effected through the entire apparatus as indicated.

The magnesium ore is preferably roasted at a temperature of about 500° C., for example, which is sufficient to drive off all absorbed water and most of the water of constitution from such materials as magnesium hydroxide and the carbon dioxide from carbonate ores. The combustion zone is operated to produce a temperature of 500 to 700° C., which can be attained readily because the coke burns readily and rapidly while in the finely divided form. If desired, gaseous fuels or oil may also be added to the combustion zone in order to increase the temperature and to conserve the carbon for reducing purposes. The air may also be preheated so as to obtain higher temperatures. The reduction vessel operates under presently known conditions, for example, at a temperature of about 2200° C., and the reaction is extremely rapid, while the materials are in the fluidized state. Furthermore, temperature control is extremely accurate under these conditions and excellent control of the reaction can be gained. Heat must be applied to the reducing vessel to bring it up to reaction temperature, and this may be effected in any desired manner, for example, by the addition of hot gases or preferably, by electrical heating.

The effluent gases from the reducer are quickly cooled by admixture with cool gas so as to reduce the temperature down to say 200° C., at which the reversal of the reaction, that is to say the union of metallic magnesium with carbon monoxide, is effectively checked. By this cooling, magnesium is also condensed and it can then be separated from the carbon monoxide. Perhaps the simplest method of cooling is to recycle the gas as shown, but since the gas is rich in CO, it is not the most advantageous gas for the purpose. If desired, the CO produced in the process may be withdrawn, converted with steam to hydrogen and carbon dioxide, which can be removed. The hydrogen may then be used for the chilling of gas and it is more effective than CO for this purpose.

When using as a raw material high grade magnesia, there will be little or no ash, but as pointed out before, ores containing silica, lime and similar materials are more readily obtainable and ash will then result. It is quite possible to remove all of the solid materials from the reducing zone along with the gas and vaporized magnesium to condense the magnesium on the solid particles. It is then necessary to distill the magnesium from the impurities, but it would be preferable to withdraw the bulk of the ash as indicated above directly from the bottom of the reaction vessel. The material withdrawn may be quite rich in impurities and little magnesia need be wasted in this way; however, the method is useful even in cases where a considerable amount of magnesia is lost by this means.

The equipment is operated at normal pressure and no problems arise from this cause. Most of the difficulties come in the construction of the various vessels operating at high temperatures. The roaster, the combustion vessel, and the associated lines may be lined with firebrick or other refractories, but such materials are not suitable for the high temperatures and the reactive condition of the magnesia in the reducing vessel. This vessel will be most desirably constructed of carbon or graphite or lined with these materials or with other materials, such as silicon carbide, and with glass of extremely high temperature refractoriness which are not reactive with magnesia or magnesium.

While the above description is devoted mainly to the application of the present process to the manufacture of magnesium, it will be understood that the same process may be applied with slight modifications to the production of other metals, that is to say those easily vaporizable materials whose oxides are reducible by carbon and notably beryllium, zinc and cadmium.

I claim:

1. In a process for producing metallic magnesium from magnesia ores, the steps which comprise preparing a fluidized stream of finely divided solid carbon and heating the same to elevated temperature, mixing the heated stream with a fluidized stream of finely divided magnesia ore whereby the magnesia is heated to a high temperature and reduced to magnesium, withdrawing the reaction products and rapidly cooling the same.

2. In a process for producing metallic magnesium from magnesia ores, the steps which comprise heating finely divided solid carbon while in a fluidized condition to a high temperature with air, withdrawing the major portion of the combustion products, withdrawing a fluidized stream of highly heated carbon and mixing the same with a fluidized stream of magnesia whereby the magnesia is heated to an elevated temperature and reduced to metallic magnesium, withdrawing reaction products and rapidly cooling the same.

3. Process according to claim 2 in which the reduction of magnesia to magnesium is effected in the fluidized state and metallic magnesium is removed as a vapor while unvaporized solids are withdrawn as a separate stream.

4. In a process for producing from its ore a metal selected from the class consisting of beryllium, magnesium, zinc, and cadmium, which elements belong to the right hand side of Group II of the Periodic Table and the oxide ores of which are reducible by carbon at elevated temperatures, the steps which comprise preparing a fluidized stream of finely divided solid carbon and heating the same to elevated temperature, mixing the heated stream with a fluidized stream of finely divided ore oxide of the metal whereby the oxide of the metal is heated to a high temperature and reduced to the metal, withdrawing reaction products and rapidly cooling the same.

HENRY J. OGORZALY.